Feb. 19, 1957
R. B. CROSSLEY
2,781,601
AUTOMATIC FISHING LINE PULLER
Filed May 21, 1954
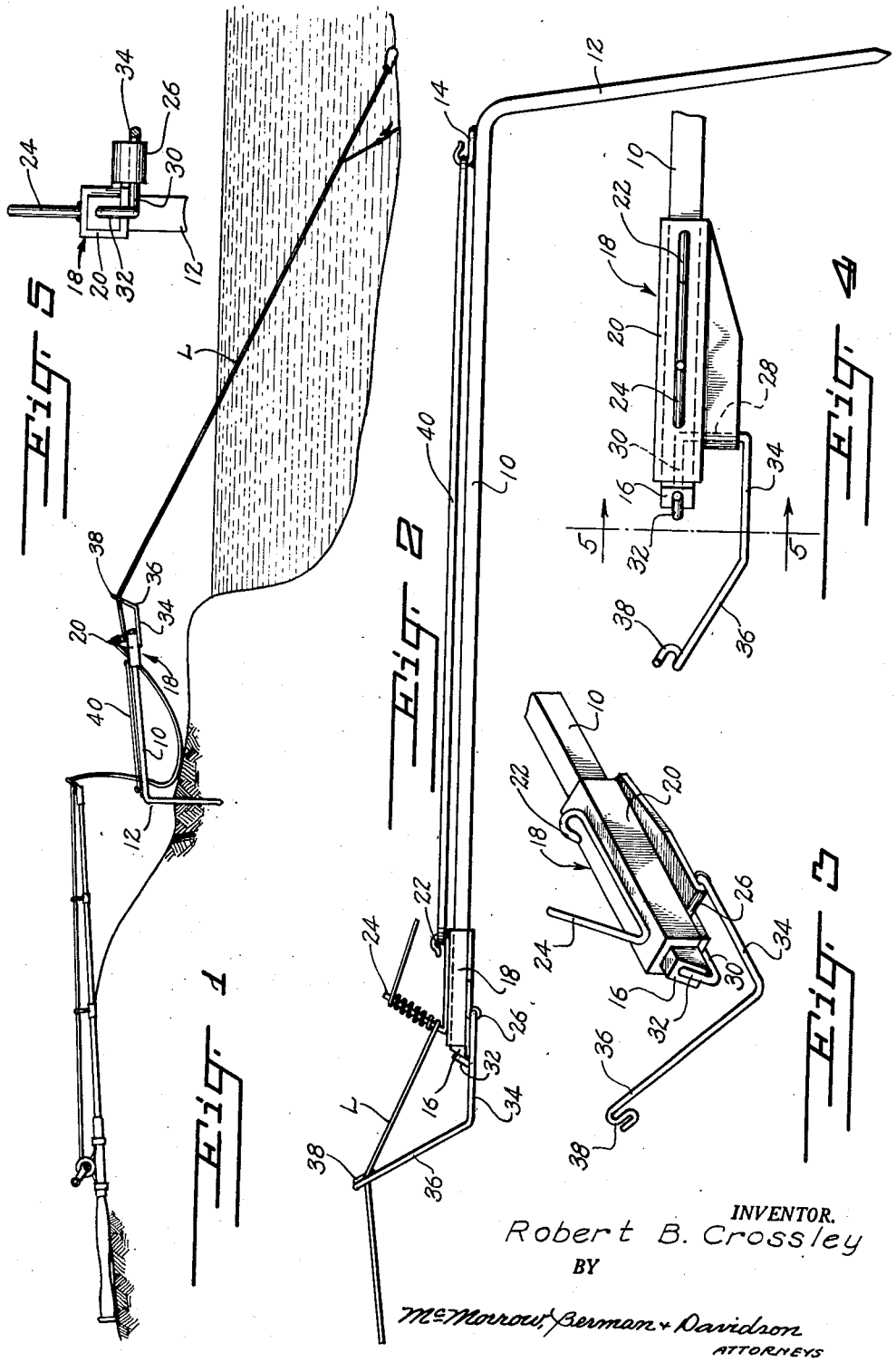
INVENTOR.
Robert B. Crossley
BY
McMorrow, Berman + Davidson
ATTORNEYS

United States Patent Office 2,781,601
Patented Feb. 19, 1957

2,781,601

AUTOMATIC FISHING LINE PULLER

Robert B. Crossley, Oklahoma City, Okla.

Application May 21, 1954, Serial No. 431,560

2 Claims. (Cl. 43—15)

This invention relates to an improved automatic puller for a fishing line, which operates to jerk the fishing line and cause the hook thereof to hook a fish striking the bait on the line.

A primary object of the invention is to provide a more efficient and practical device of this character, which can be manufactured in a rugged and serviceable form at relatively low cost.

Other important objects and advantageous features of the invention will be apparent from the following description, and the accompanying drawings, wherein for purposes of illustration only, a preferred embodiment of the invention is set forth in detail.

In the drawings:

Figure 1 is a view illustrating a fishing line puller in accordance with the present invention in use;

Figure 2 is an enlarged side view of the fishing line puller;

Figure 3 is a fragmentary perspective view of one end thereof;

Figure 4 is a top plan view of Figure 3; and

Figure 5 is a fragmentary end view of Figure 4.

Referring to the drawings in detail, the illustrated device comprises a support in the form of an elongated guide bar, preferably formed of square stock, having on its rear end a downwardly extending ground engaging leg 12 which is at an obtuse angle to the bar so that when the leg 12 is thrust substantially vertically into the ground, the guide bar 10 will extend therefrom at a forward and upward angle to the ground. Carried by the guide bar 10 adjacent the leg 12 and extending upwardly from said guide bar is a rear hook 14. The forward end of the guide bar is upwardly beveled to define a retainer 16 for a trigger dog hereinafter described.

The bar 10 has mounted thereon for longitudinal sliding movement therealong a slide 18 which comprises a substantially rectangular tubular body 20 having secured to its upper side an assembly including a forward hook 22, which is aligned with the rear hook 14, and an upwardly extending rearwardly inclined pin 24 at the forward end of the slide. The pin 24 defines a fishing line anchor about which an intermediate part of a fishing line is adapted to be wound, as will be readily understood upon reference to Figures 1 and 2. Secured to and depending from the underside of the slide 18 adjacent the forward end thereof is a transverse laterally projecting barrel 26 in which is pivotally engaged a trigger shaft 28 having on one end a latch arm 30 terminating at its forward end in a latch hook 32. A trigger on the other end of the shaft 28 includes an arm 34 which extends forwardly from the shaft 28 and terminates in another arm 36 which is upwardly and forwardly angulated with respect to the arm 34. On the forward end of the arm 36 is a loop 38 defining a line guide of the type commonly referred to in the textile art as a pigtail.

Connected to and stretched between the hooks 14 and 22 is an elastic band 40 which, when the trigger dog or hook 32 is engaged with the retainer 16 on the forward end of the guide bar 10, is extended so as to exert a rearward pulling tension on the slide 18.

In use, it will be evident that with the slide 18 in its forward position and the trigger dog 32 engaged with the retainer 16, the slide is held in its forward or cocked position. In this position of the slide an intermediate part of the fishing line L is passed through the line guide 38 and wound around the anchor pin 24, substantially as illustrated in Figure 2. It will be evident that when a forward or downward pull is exerted on the fishing line by a fish striking the bait on the line and attempting to swallow the bait, the trigger will be moved forwardly and downwardly so as to disengage the latch dog 32 from the retainer 16 and free the slide 18 to be pulled rearwardly by the elastic band 40, whereby an energetic jerk is exerted on the fishing line to cause the hook on the line to set in the fish so that the fish may be landed by the fisherman.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In an automatic fishing line puller, an elongated guide rod having a rear end and a forward end, a tubular slide circumposed on said guide rod, said slide having a rear end and a forward end and upper and lower sides, a trigger shaft journaled transversely on the lower side of the slide, a forwardly extending latch arm on one end of said shaft, said latch arm terminating in a latch dog, the forward end of the guide bar having a latch dog retainer with which said latch dog is engageable to hold the slide in its forward cocked position, a trigger on and extending forwardly from the other end of said shaft, said trigger comprising a forwardly angulated arm having a forward end, a line guide loop thereon, an assembly secured to the upper side of the slide including a forward hook and a rearwardly inclined fishing line anchor pin, a rear hook on the rear end of said guide bar aligned with said forward hook, and an elastic band connected to and stretched between said rear hook and said forward hook.

2. In an automatic fishing line puller, an elongated guide rod having a rear end and a forward end, a tubular slide circumposed on said guide rod, said slide having a rear end and a forward end and upper and lower sides, a trigger shaft journaled transversely on the lower side of the slide, a forwardly extending latch arm on one end of said shaft, said latch arm terminating in a latch dog, the forward end of the guide bar having a latch dog retainer with which said latch dog is engageable to hold the slide in its forward cocked position, a trigger on and extending forwardly from the other end of said shaft, said trigger comprising a forwardly angulated arm having a forward end, a line guide loop thereon, an assembly secured to the upper side of the slide including a forward hook and a rearwardly inclined fishing line anchor pin, a rear hook on the rear end of said guide bar aligned with said forward hook, and an elastic band connected to and stretched between said rear hook and said forward hook, said trigger being located laterally outwardly of a side of said slide and said line guide loop being spaced forwardly of the forward end of the guide bar.

References Cited in the file of this patent

UNITED STATES PATENTS

| | | |
|---|---|---|
| 374,737 | Geils | Dec. 13, 1887 |
| 2,590,721 | Muth | Mar. 25, 1952 |
| 2,657,493 | Coles | Nov. 3, 1953 |
| 2,659,174 | Leach | Nov. 17, 1953 |
| 2,696,692 | Zielinski | Dec. 14, 1954 |
| 2,712,194 | Stefano | July 5, 1955 |

FOREIGN PATENTS

| | | |
|---|---|---|
| 638,747 | France | June 1, 1928 |